United States Patent Office 3,018,288
Patented Jan. 23, 1962

3,018,288
PROCESS FOR PRODUCTION OF
CYANURIC CHLORIDE
Masakata Tokime and Michiomi Kimura, Tokyo, Japan
No Drawing. Filed Feb. 20, 1959, Ser. No. 794,500
Claims priority, application Japan Jan. 9, 1959
2 Claims. (Cl. 260—248)

This invention relates to a process for the production of cyanuric chloride by the catalytic reaction of cyanogen chloride in the gas phase.

Heretofore it has been known, from U.S. Patent No. 2,491,459 that cyanuric chloride may be produced by the catalytic reaction of cyanogen chloride in the gas phase, wherein charcoal is used as the catalyst. It is also known, from U.S. Patent No. 2,753,346 that cyanuric chloride may be produced in the gas phase by employing as the catalyst, an active carbon whose moisture content is below 1%.

However, in the method of Patent No. 2,491,459, it is only possible to effect a certain degree of polymerization by using a relatively large quantity of charcoal for a given space velocity of cyanogen chloride. Moreover, it is practically impossible to practice this method on a large commercial scale since the yield and the catalytic life differ, depending on the type of charcoal used. There is also a difficulty encountered in the removal of the by-products.

On the other hand, the use of commercial active carbon with a moisture content of over 1%, in the above methods produces a low yield of cyanuric chloride. The life of the catalyst is of only several hours duration, and there is produced a great amount of by-products with a consequent great difficulty in refining, so that this method cannot be used for production on an industrial scale.

The following defects will occur even if an active carbon with a moisture content below 1% is used:

(a) The yield varies greatly depending on the type of active carbon employed.

(b) There is a non-uniformity of purity in the cyanuric chloride product.

(c) The duration of catalytic life varies greatly. For example, a longest catalytic life of about 50 hours is achieved when cyanogen chloride is passed through 1 liter of the catalytic zone at the rate of 500 g. per hour. From an industrial standpoint, the catalyst must be frequently replaced, resulting in undesirable variations in the yield, purity, and the like, of the product each time the catalyst is replaced.

(d) It is necessary to dry the active carbon immediately before each use due to the fact that active carbon with a moisture content below 1% will absorb moisture and attain a moisture content of about 3 to 25% during storage and handling.

In accordance with this invention, cyanuric chloride is manufactured by catalytic polymerization of cyanogen chloride in the gas phase. It is now possible to produce cyanuric chloride of excellent purity and very high yield by using, as the catalyst for the catalytic polymerization, a commercial active carbon from which the oxides, hydroxides, and salts of the group 1 the group 2 metals (of the periodic table) have been removed to such an extent that the pH of an aqueous extract, obtained by the extraction of the combustion ash of said commercial active carbons with water in an amount equal to about 100 times by weight thereof, is not perceptible in phenolphthalein. That is, the pH is about 8 and more particularly about 7.6 or less. Moreover, it was found in this case that the catalytic life of the active carbon of this invention, when compared with the average catalytic life of commercial active carbon and commercial active carbon with a moisture content below 1%, was at least five times as great and was normally about 15 to 20 or more times as great.

There are a number of carbonaceous organic materials that are used as raw materials for active carbons, the most important of which are wood, sawdust, coal, lignite, coconut shells, and the like. Normally, these materials are formed into active carbons by one of the following methods: (1) The so-called zinc chloride method which comprises permeating one of the above materials with the chlorides of calcium, magnesium, zinc and the like, and then carbonizing this material in the absence of oxygen at temperatures of about 600 to 800° C., followed by washing out the metallic salts and drying. (2) The so-called gas-activation method comprises first carbonizing one of the above materials at temperatures below 600° C. in the absence of air and thereafter oxidizing a portion of the carbon with steam, carbon dioxide gas and the like, at temperatures of either 300 to 600° C., or 800 to 1000° C., to remove the hydrocarbons and to cause erosion of the carbon surface, thereby activating the same. (3) A type of gas-activation method in which the material to be carbonized is permeated in advance with chemicals that will release suitable gases at activation temperatures, such as for example, dolomite, phosphoric acid, etc. In methods (2) and (3) above, the use of chemicals such as caustic soda, potassium sulfide, and potassium thiocyanate, causes the erosion of the adsorptive surface and it is believed that this enhances the adsorptive power.

Considering these raw materials and the processes of manufacture, it is clear that the usual commercially available active carbons will all contain substantial amounts of inorganic matter. In general, the ash content of these active carbons ranges from about 2 to about 9%. By way of illustration, the compositions of the ash contents of several of the different kinds of raw material woods are shown in Table 1.

TABLE 1
Compositions of the ashes of active carbons

|  | Kind of wood used as raw material | | | |
| --- | --- | --- | --- | --- |
|  | Beech | Japanese oak | Pine | Japanese cedar |
| Composition, percent: | | | | |
| $K_2O$ | 28.62 | 33.17 | 14.31 | 19.86 |
| $Na_2O$ | 1.91 | 8.30 | 0.99 | 1.37 |
| $CaO$ | 37.65 | 29.90 | 53.64 | 33.97 |
| $MgO$ | 11.23 | 6.93 | 10.69 | 11.27 |
| $Fe_2O_3$ | 1.25 | 1.50 | 0.11 | 1.42 |
| $Mn_3O_4$ | 5.08 | 0.64 | 3.34 | 23.96 |
| $SiO_2$ | 5.98 | 5.17 | 2.61 | 2.73 |

On the other hand, when the matter of ash content of an active carbon is considered from the standpoint of the method employed in its manufacture, the ash content of the gas-activation method was found to be the least. When a study was made of the compositions of the commercial active carbons produced by the gas-activation method, the results were as shown in Table 2, below.

TABLE 2
Ash compositions of commerical active carbons

| Ash constituents of commercial active carbons | Weight |
| --- | --- |
| $K_2O$ | 1.4–33 |
| $Na_2O$ | 1 – 8 |
| $CaO$ | 33 –53 |
| $MgO$ | 7 –11 |
| $Fe_2O_3$ | 0.1– 1.5 |
| $Mn_3O_4$ | 0.6– 5 |
| $SiO_2$ | 2.5– 6 |

In those active carbons produced by method other than the gas-activation method, the total ash content becomes still greater because of the ash content of the activating adjuvants. For example, in the zinc chloride method, although the zinc chloride is washed out and recovered, the ash content increases due to the fact that a considerable amount of zinc remains.

A detailed study has been made to determine what effect the various constituents of these ash contents have on the polymerization reaction of cyanogen chloride. As a result, it was found that of the constituents indicated in Table 2, those oxides and hydroxides of metals belonging to groups 1 and 2 of the periodic table, even though present in very minute quantities, have a hindering action on the polymerization reaction of cyanogen chloride. Although the mechanism of this hindering action is not yet known, it is known that the oxides and hydroxides of these metals have a catalytic action which forms unkonwn colored substances in the cyanogen chloride polymerization process. The color of this substance varies from pale yellow to dark brown according to the extent of the quantity and types of the by-products formed. This unknown colored substance is insoluble in almost all solvents and has a very high melting point. It is presumed that this substance covers the surface of the active carbon thereby rendering it inactive. Furthermore, by being present within the cyanuric chloride product, the quality of the product is lowered.

The oxides and hydroxides that are most pronounced in creating this undesirable side reaction, are the oxides and hydroxides of the group 2 metals of the periodic table, and specifically, the oxides and hydroxides of magnesium, calcium, strontium, barium, zinc, and cadmium. These metals are followed in activity by the oxides and hydroxides of the group 1 metals, for example, those of potassium and sodium. It has been found that when these metals are not present in the active carbons in the form of oxides and hydroxides at room temperatures, but as metallic compounds, like, for example, the salts of the above metals, these salts can be converted into metallic oxides, hydroxides, carbonates, and the like. The aqueous solution of the ash contents resulting from the incineration of these active carbons shows alkaline reactions that were similar to the aforementioned oxides and hydroxides as to the risk involved in hindering the polymerization reaction of cyanogen chloride. The reason for this is believed to be that those salts forming metallic oxides show an alkaline reaction at the polymerization reaction temperature of cyanogen chloride.

Moreover, in this connection it was unexpectedly learned that even if salts such as sodium chloride are calcined by themselves, their aqueous solutions will show alkaline reactions. For example, while the formation of such substances as sodium oxide was not discernible, it was found that when an active carbon ash was treated with an acid to obtain a pH of 7.2, and was washed, impregnated with sodium chloride in an amount equal to 1% of the weight of the active carbon, incinerated, and extracted with water in an amount equal to about 100 times the weight of the ash, the pH of the extract was 8.3. (The pH value of the 1% aqueous solution of the sodium chloride used on this occasion when subjected to strong heat by itself for the same number of hours as the above incineration time was 5.6). This is believed to be due to the fact that volatile hydrochloric acid is lost earlier by the hydrolytic adsorption phenomenon of the active carbon. Active carbons also possess the properties of exchange adsorption, and particularly reduction, as well as various other selective adsorption properties. Therefore, if the various salts, which are normally believed not easily converted into their oxides and the like by calcination, are adsorbed on the surfaces of the active carbons, they are considered to be easily converted to their oxides and the like. Hereinafter, these metallic oxides, hydroxides, and salts will be referred to as harmful metallic compounds for the sake of convenience.

The oxides and hydroxides of the other metals belonging to groups 3, 6, 7, and 8, such as aluminum, chrome, manganese, iron, and the like, and the salts of these metals which can become oxides when incinerated, have to a slight degree, effects that are similar to those mentioned above. However, no conspicuous hindering reactions will occur, unless the amount of these metals that is present becomes quite large. On the other hand, it was found that the oxides and oxide convertible salts of group 4 metals gave no evidence of hindering reactions. An example of this group is silicon oxide.

When the above results were considered, the pronounced differences resulting from the catalytic cyanogen chloride polymerization action of the different types of ordinary active carbons were believed to be attributable to the differences in the respective amounts of ash contents, and to the variations in the amount of the harmful metallic compounds comprising the respective ash contents. Moreover, it became clear that there was practically no relationship between the adsorptive power and the catalytic efficiency of these ordinary active carbons. However, when ordinary active carbons contain such harmful metallic compounds as the oxides, hydroxides and salts of the metals mentioned above, then the reaction proceeds with a good yield during the first several to several tens of hours, but the catalytic life shortens precipitously. While it is possible to control the harmful catalytic effects of the above-mentioned compounds to a certain extent, it is never entirely satisfactory. Therefore, so long as these harmful metallic compounds are present, the life of the catalyst will be short. Moreover, the catalyst's life is very unstable, and when replacement of the catalyst is not made at definite intervals, it is impossible to control the purity of the product.

This being the case, in accordance with the present invention, the oxides and hydroxides of metals belonging to groups 1 and 2 of the periodic table, for example, the oxides and hydroxides of magnesium, calcium, strontium, barium, zinc, cadmium, potassium, sodium, and the like, and the salts of these metals whose aqueous solutions show alkaline reactions, and further, the salts of these metals which may be converted into oxides and hydroxides at the polymerization temperature of cyanogen chloride, are removed as much as possible from the commercial active carbons. The production of cyanuric chloride is then accomplished by catalytically polymerizing cyanogen chloride in the gas-phase while employing those active carbons from which these metallic oxides, hydroxides, and salts have been removed to such an extent as to preclude the occurrence of any serious harmful effects in the polymerization reaction of cyanogen chloride.

In this invention, the extent of the removal of these harmful metallic compounds is determined by testing the pH of the aqueous extract of the ash of the incinerated active carbons, since it is difficult to examine the metallic compounds themselves at the polymerization reaction temperature of the cyanogen chloride. The ash examination reveals that the removal of the metallic compounds which are harmful at the reaction temperature, can be accomplished to an extent that they are of no hinderance in carrying out the polymerization reaction.

In order to remove these harmful metallic compounds from the active carbons, any of the known methods may be employed, such as the method of acid-treating the active carbon followed by washing, the regular dialytic method, and the method of electrolytic dialysis. In general, the method of acid-treatment followed by washing is the most convenient and economical and is therefore recommended. Generally, as a removal method, the dialytic method is not desirable from an industrial standpoint because of the excessive time required. In comparison, the electrolytic dialysis method is preferable, but the acid treating and washing method is the most convenient since it fully attains the result desired.

While it is possible to employ any of the following organic and inorganic acids, such as acetic acid, propionic acid, lactic acid, hydrochloric acid, sulfuric acid, fluoric acid, and the like in the acid treating method, it has generally been found that the inorganic acids are preferable to the organic acids. Among the inorganic acids, nitric acid acts on the carbon itself, having a tendency to lower the catalytic effectiveness and is therefore undesirable. The metallic salts of sulfuric acid and phosphoric acid generally become water-insoluble and tend to be difficult to remove. The most preferable acid therefore, is hydrochloric acid.

Although the time required for the acid treatment and washing to remove these harmful metallic compounds is not uniform, due to the variations in the amounts and compositions of the ash content depending upon the kind of active carbons used, normally, while employing 20% hydrochloric acid under boiling condition, an acid treatment of less than 24 hours is inadequate. The acid treatment should be carried out under the above condition for at least 48 hours and preferably for 72 hours or more. This is followed by a complete washing treatment of at least 48 hours or more duration.

It is also to be understood that, depending on the kind of active carbon, there may be instances where acid treatment of more than 150 hours and washing of 100 hours or more are required.

Table 3, below, shows the ash content and the reduction in the harmful metallic compounds of the constituents thereof of a commerical active carbon (granular carbon produced by Dai Nippon Active Carbon Co., Ltd.) when treated for 100 hours under boiling condition with 20% hydrochloric acid and followed by washing.

TABLE 3

|  | Untreated | After acid treated and washed |
|---|---|---|
| Ash content, percent | 8.40 | 2.15 |
| pH of ash | 11.0 | 7.1 |
| $SiO_2$, percent | 21.6 | 86.1 |
| $K_2O Na_2O$ percent | 10.7 | 0.00 |
| MgO, percent | 10.6 | 0.00 |
| CaO, percent | 32.3 | 0.00 |
| $Al_2O_3$, percent | 11.3 | 4.5 |
| $Fe_2O_3$, percent | 12.6 | 7.7 |

The degree to which the harmful metallic compounds contained in commercial active carbons are removed depends on the life desired for the active carbon employed, the product purity, the yield desired, etc., and therefore is not necessarily a fixed limit. The more one removes these harmful metallic compounds, no matter how little, the more the catalytic efficiency and life of the catalyst active carbon is enhanced. Each removal results, of course, in a lowering of the pH of the ash of the active carbon when incinerated.

By way of illustration, Table 4, below shows the relationship between the acid treatment and washing time of the active carbons, and the resultant pH of the water-extracts of their ashes, as well as the catalytic life of these active carbons. The pH of the ashes of this table has been measured in the same manner as of Table 3. That is, the pH was with an aqueous extraction solution resulting from the extraction of 0.01 g. of the ash with 1 cc. of water.

The results of Table 4 were obtained with the following materials and conditions. Active carbons produced by various combinations of acid and washing treatments of Edocoal granulated carbon (ash content 4.2% with its pH 10.2) were employed as the catalyst. At temperatures of 380° ±5° C., 250 g. of cyanogen chloride were passed through 500 cc. of this catalyst and measurements were made when a single pass yielded over 80%.

TABLE 4

| No. | Acid treatment time, hours | Washing time, hours | pH of ash | Time more than 80% yield obtained | Color phase of cyanuric chloride |
|---|---|---|---|---|---|
| 1 | None | None | 10.2 | 0 | Yellow. |
| 2 | 24 | 24 | 8.8 | 59 | Yellow, excepting the first 10 hours. |
| 3 | 48 | 48 | 8.0 | 156 | Yellowish, excepting the first 20 hours. |
| 4 | 72 | 48 | 7.8 | 296 | Yellowish excepting the first 40 hours. |
| 5 | 72 | 72 | 7.6 | 898 | White, excepting the last 80 hours which showed slight coloration. |
| 6 | 106 | 72 | 7.2 | 1,230 | White for the whole period. |

As is clear from the above Table 4, the longer the acid treatment and washing time, the lower the pH of the aqueous extraction of the ash, the life of the catalyst is extended, and the purity of the product is enhanced. When the pH of the aqueous extraction of the ash becomes less than 8.0, the catalytic life necessary to maintain a yield of over 80% becomes greater than 156 hours. This shows how the control of the product purity is achieved and how the working of this process is made possible on an industrial scale through the use of this invention. Furthermore, when the pH of the water extraction of the ash becomes 7.6 or below, the catalytic life amounts to about 900 hours or more and continuous working of cyanuric chloride production becomes ideally suitable.

In order to confirm the fact that the amount of harmful metallic compounds, which are contained in the commercial active carbons (such as the above oxides, hydroxides, salts, and the like of the metals of groups 2 and 1 of the periodic table), possess a significant relationship to the catalytic effectiveness of the active carbon catalysts employed in the polymerization reaction of cyanuric chloride, several commercial active carbons were acid treated and washed thoroughly. They were then impregnated with various metallic salts, and the change in the catalytic life was examined. The results were tabulated in Table 5, below. The results of this table were obtained by the following experiment.

The active carbon obtained as shown by run No. 6 in Table 4, was impregnated with different kinds of salts as shown below. After drying, 125 g. of cyanogen chloride was passed through 250 cc. of each of these active carbons at temperatures of 380° C. to 5° C. The yields were measured one hour later.

TABLE 5

| Kind of salts | Amount contained in active carbon (percent) | Yield after 1 hour | pH of the ash of active carbon |
|---|---|---|---|
| None | None | 91.5 | 7.2 |
| NaCl | 1 | 78.9 | 8.3 |
| $Na_2SO_4$ | 1 | 81.9 | 8.2 |
| $K_2CO_3$ | 1 | 64.3 | 9.2 |
| $MgCl_2$ | 0.5 | 52.7 | 9.0 |
| $MgSO_4$ | 0.5 | 80.8 | 8.0 |
| $CaCl_2$ | 0.5 | 70.4 | 8.6 |
| $CaSO_4$ | 0.5 | 81.7 | 7.8 |
| $ZnCl_2$ | 0.5 | 74.2 | 8.4 |
| $BaCl_2$ | 0.5 | 85.3 | 7.8 |
| $BaSO_4$ | 0.5 | 89.6 | 7.6 |
| $AlCl_3$ | 10 | 88.8 | 7.4 |
| $MnCl_2$ | 25 | 77.7 | |
| $FeCl_3$ | 25 | 72.3 | |
| $Fe_2(SO_4)_3$ | 25 | 67.7 | |
| $CoCl_2$ | 25 | 57.7 | |

As is apparent from Table 5, practically all of the salts of the group 1 and group 2 metals (of the periodic table) produce alkaline reactions in their aqueous solution when their respective active carbons are incinerated. Even if the amount is slight, it can be seen that the influence of these metals is great. Moreover, it can be seen that, in general, the harmfulness of the carbonates and the chlorides is greatest, whereas the sulfates are comparatively less harmful.

Also, in Table 5, since a 1% or so increase in the amount of salts impregnated showed hardly any effect on those active carbons with more than 10% by weight of salts, large amounts of impregnating salts were used. The low results in these cases, it is believed, were due to the fact that the activating surfaces of the active carbons were covered.

In the method of this invention, the active carbon to be employed may be either granulated or powdered active carbons. Generally, when powdered active carbons are employed, their use as fixed catalysts is unsuitable, it being preferable to employ them as a fluid catalyst. However, in accordance with the method of this invention, there is no great difference in effectiveness whether one employs the fixed catalysts of fluid catalysts. It is considered to be more advantageous to use the fixed catalysts since they are simpler from the equipment standpoint. For fixed catalysts, the granular carbons are suitable, and these are prepared by screening activated carbons with a screen of a given mesh. At times, granulation is accomplished by a variety of means prior to activation. Inasmuch as this granular carbon is chiefly used in gas-phase reactions, the inorganic substances contained therein do not affect the gas adsorption power, treatment with acids is hardly ever carried out. Also, if the ash content of these granular carbons is reduced too much, they become very fragile during reactivation. Hence, it is common to allow the retention of a certain amount of the ash. As a result, the ash of granulated carbons is usually of considerably strong alkalinity.

When a great number of active carbons on the market were measured for the pH, it was found that differences existed even among those of the same brand produced by the same company, depending upon the time of their manufacture. By way of illustration the actual values are shown in Table 6, below.

TABLE 6

*Actual pH's of commercial active carbons and pH's of their ashes*

| Brand name | Company | Type | pH [1] | pH of ash |
|---|---|---|---|---|
| Edocoal M₄C | Dai Nippon Active Carbon | Granular | 8.5 | 10.2 |
| Tsurumicoal CX | Tsurumi Carbon | do | 7.8 | 11.2 |
| Shirasagi W | Takeda Pharmaceutical | do | 7.6 | 9.2 |
| Edocoal AB | Dai Nippon Active Carbon | Powder | 5.6 | 8.2 |
| Tochicoal | Tochigi Chemical | do | 8.8 | 10.8 |
| Nittan | Hitachi Carbon | do | 8.4 | 9.6 |
| Desorex IV | Degussa | Granular | 6.4 | 11.4 |
| Desorex II/III | do | do | 5.8 | 8.8 |
| Eponit 114 | do | Powder | 7.6 | 10.8 |
| Eponit 116 | do | do | 7.6 | 9.0 |

[1] pH's of active carbon are defined as the pH of a suspension of 1 g. of active carbon in 30 ml. of distilled water.

An additional explanation of the properties of commercial active carbons will be made here.

In general, there are two types of active carbons commercially available, that is, the powdered active carbons which are chiefly used in the liquid phase for the purpose of decolorization, and the granular carbons which are chiefly used in the gas phase for adsorption. The powdered active carbons are prepared by pulverizing the carbons after activation, followed by screening to given particle sizes, depending on the specific end use. The pH of the active carbon in this case is alkaline when the method of activation which is commonly practiced at present is employed. Active carbons are usually used without further adjustments of their pH value. In some cases, a pH near neutral is desired, as for example, in cane sugar, whereas for corn sugar the desired pH is between 4 and 6, depending on individual operating conditions. Hence, for these purposes, acids are added to adjust the pH. Moreover, for those uses in which the active carbon is employed in the liquid phase, since trouble might arise by the presence of ashes which are extracted by the solvent, acid treatment and washing are performed. This, however, is performed only to the extent necessary for normal use.

Usually, most commercial active carbons contain considerable amounts of inorganic substances which are derived from both the raw material and the chemicals used during the activation process. The greater part of these substances are not soluble or at least, non-extractable and are thus normally considered to be inert. The fact that these inorganic substances contained in active carbons are difficult to extract is believed to be because these inorganic substances are not just merely contained in the active carbons, but appear to be chemically combined due to the existence of some kind of bonding within the carbon. In the normal acid treatment of powdered active carbons, it is sufficient to remove those inorganic substances that can be extracted, the removal of the same inorganic substances not being performed as thoroughly as is done in this invention. Accordingly, when the commercially available powdered active carbons are employed in the process of this invention, it is hardly ever possible to use them as is for the polymerization of cyanuric chloride, since the ordinary acid treatment performed on these active carbons leaves a large amount of alkaline earth metals, even though a considerable amount of these metals has been removed.

Therefore, in accordance with this invention, the oxides, hydroxides, and salts of the metals belonging to groups 1 and 2 of the periodic table are removed from the commercial activated carbon catalysts to such an extent that the pH of an aqueous extract obtained by the extraction of the combustion ash of said commercial active carbons with water in an amount of about 100 times by weight thereof is not perceptible in phenolphthalein. That is, if the pH of this extract is about 8 or especially about 7.6 or less, it is possible to eliminate all of the defects that arise when conventional, commonly available active carbons are used.

More particularly, it has been found that even if the moisture content of the active carbon is intentionally raised to about 50%, there is no effect whatever on the product yield or the catalytic life, except for the fact that moisture will come out in the early stages of the reaction. Moreover, since no side reactions occur at all, it is clear that not only is the quality of the product very uniform over a great number of hours, but also that when cyanogen chloride is passed through 1 liter of catalyst at the rate of 500 g. per hour, its life is such that the catalyst is able to maintain a uniform quality of the product and a favorable yield for 1000 hours. Also, it has been found that if the commonly available active carbons having conspicuous variations in their catalytic actions due to the differences in the raw materials from which they were produced, differences, in the period of manufacture, differences in the methods of manufacture, etc., are treated in accordance with the process of this invention, these variations would become very small and uniform results would be obtained at all times.

Furthermore, since in this invention it is possible to pass cyanogen chloride through 1 liter of catalyst at the rate of 500 g. per hour, there is the advantage that the amount of the catalyst may be reduced to a comparatively small amount in relation to a given quantity of the product.

Moreover, in accordance with this invention, inasmuch as the harmful metallic compounds described above are removed from the commercial active carbons before employing them as the polymerization catalyst, it is possible to use active carbons that are activated by other procedures. For example, the active carbons produced by the gas activation method, those produced by the so-called zinc chloride method and those activated with dolomite, phosphoric acid and the like as well as those whose activity has been enhanced by alkalis such as caustic soda, potassium sulfide, and the like, may be employed.

The preferred temperature of reaction at which the cyanuric chloride is polymerized in accordance with the method of this invention is normally about 300 to 450° C. Moreover, it was found that even if chlorine accompanies the cyanogen chloride which passes through the active carbons of this invention, the catalytic efficiency manifested was completely the same. On the other hand, even when a minute amount of hydrocyanic acid accompanies the cyanogen chloride, the catalytic efficiency of the active carbon was greatly reduced. Therefore, it is necessary to ensure that the cyanogen chloride used as the raw material contain substantially no traces of hydrocyanic acid.

The process of this invention will be illustrated with the following examples. These examples, however, are only used for the purpose of illustration and are not to be construed as limiting the scope of the invention.

EXAMPLE 1

The commercially available Edocoal granular carbon $M_4$ was boiled together with 20% hydrochloric acid for 100 hours and then washed for 72 hours. The moisture content of this after air drying was 25.6%. The pH of the aqueous extract of the ash of this active carbon was 7.1. A reaction tower was filled with 40 l. of this active carbon and while maintaining the reaction temperature between 350°–400° C. by means of an air bath from the outside of the reaction tower, cyanogen chloride gas which contained substantially no hydrocyanic acid was passed through at the rate of 20 kg. per hour. The polymerized cyanuric chloride was continuously withdrawn from the condensing chamber, showing the following result: namely, the average yield for the first 10 hours was 82.6%; which gradually rose showing for the next 20 hours an average of 86.5%; the next 100 hours, 90.7%; the next 800 hours, 93.5%; the next 100 hours, 85.3%; the next 100 hours, 82.6%; and since at the next 100 hours it became 79.9%, the catalyst was replaced. During this whole period, the quality of the product was exceedingly high and uniform, being pure white.

EXAMPLE 2

The commercially available Edocoal granulated carbon was boiled together with 20% hydrochloric acid for 72 hours and washed for 120 hours. When this was air dried, the moisture content was 22.3% and the aqueous extract of the ash had a pH of 7.2. A reaction tower was filled with 60 l. of this active carbon, and in order to regulate the reaction heat, the active carbon at the gas entry port was diluted to about 50% with Raschig rings and the temperature of the reaction tower was regulated to be 380°±5° C. employing an air bath. Since the production of reaction temperature is considerable with amounts as great as this, with the exception of the early stages, the air bath was used chiefly for cooling purposes. When cyanogen chloride was passed through this, the following result were obtained. Namely, the average yield for the first 10 hours was 83%, the next 20 hours, 87%, the next 100 hours, 91%, the next 400 hours, 95.5%, the next 300 hours 94.3%, the next 200 hours, 90.3%, the next 100 hours, 85.4%, the next 100 hours, 83.2%, and since the next 100 hours the yield became 80.8%, the catalyst was replaced. During this whole period the quality of the cyanuric chloride product was very excellent and was pure white from the start to finish.

EXAMPLE 3

The commercially available powdered active carbon (produced by the Takeda Pharmaceutical Co.) manufactured by the zinc chloride method was boiled with 20% hydrochloric acid for 72 hours, washed for 72 hours, and thereafter dried at 100° C. to a moisture content of 3.6%. When cyanogen chloride was passed through 500 cc. of this active carbon at the rate of 250 g. per hour in the fluid phase maintain at about 380° C., the yield one hour after starting the passing reached 92.1% and 10 hours later reached 96.8%. The yield was 82.3% after a continuous operation of 1000 hours.

What is claimed is:

1. In a process for the production of cyanuric chloride by passing cyanogen chloride over an active carbon, the improvement which comprises using as said active carbon one which has been treated with an acid selected from the group consisting of hydrochloric, acetic, fluoric, propionic, lactic and sulfuric acids until the oxides, hydroxides, and salts of the metals belonging to groups 2 and 1 of the periodic table contained in said active carbon are removed by said acid treatment and the pH of an aqueous extract obtained by the extraction of the combustion ash of said active carbon with water in an amount about 100 times by weight thereof reaches within the range that is not perceptible in phenolphthalein.

2. A process for the production of cyanuric chloride according to claim 1 wherein said pH of an aqueous extract obtained by the extraction of the combustion ash of said active carbon with water in an amount about 100 times by weight thereof is at most about 8.

References Cited in the file of this patent

UNITED STATES PATENTS

| | | |
|---|---|---|
| 2,003,277 | Olson | May 28, 1935 |
| 2,300,600 | Steely et al. | Nov. 3, 1942 |
| 2,753,346 | Huemer | July 3, 1956 |
| 2,872,446 | Von Friedrich et al. | Feb. 3, 1959 |

FOREIGN PATENTS

| | | |
|---|---|---|
| 17,731 | Great Britain | June 19, 1915 |
| 13,208 | Netherlands | Dec. 15, 1924 |